United States Patent
Krahl

(10) Patent No.: US 8,292,978 B2
(45) Date of Patent: Oct. 23, 2012

(54) RADIAL AIR INTAKE DEVICE WITH INTEGRATED BYPASS FOR AN AIR INLET

(75) Inventor: Kornelius Krahl, Mering (DE)

(73) Assignee: Eurocopter Deutschland GmbH, Donauworth (DE)

( * ) Notice: Subject to any disclaimer, the term of this patent is extended or adjusted under 35 U.S.C. 154(b) by 336 days.

(21) Appl. No.: 12/726,670

(22) Filed: Mar. 18, 2010

(65) Prior Publication Data
US 2011/0001003 A1    Jan. 6, 2011

(30) Foreign Application Priority Data
Jul. 2, 2009  (EP) ..................... 09400033

(51) Int. Cl.
*B01D 46/00* (2006.01)
*F02C 7/05* (2006.01)
(52) U.S. Cl. .......... 55/306; 55/309; 55/422; 60/39.092; 244/53 B
(58) Field of Classification Search .......... 55/306, 55/385.1; 95/273; 96/417; 60/39.092, 779; 244/53 B, 53 R, 73 R
See application file for complete search history.

(56) References Cited

U.S. PATENT DOCUMENTS

| 2,425,139 | A  | * | 8/1947 | Vokes ............................ 55/306 |
| 5,865,398 | A  | * | 2/1999 | Pashea et al. ................ 244/53 B |
| 2009/0139200 | A1 | * | 6/2009 | Colaprisco ................. 60/39.092 |
| 2009/0145101 | A1 | * | 6/2009 | Suciu et al. ................ 60/39.092 |
| 2011/0146294 | A1 | * | 6/2011 | Townsend ....................... 60/779 |

FOREIGN PATENT DOCUMENTS

| FR | 2 906 569 A1 | 4/2008 |
| FR | 2 924 471 A1 | 6/2009 |
| GB | 2 242 931 A | 10/1991 |

OTHER PUBLICATIONS

European Search Report, dated Nov. 23, 2009, from corresponding European application.

* cited by examiner

*Primary Examiner* — Duane Smith
*Assistant Examiner* — Minh-Chau Pham
(74) *Attorney, Agent, or Firm* — Brooks Kushman P.C.

(57) ABSTRACT

A radial air intake device for an engine or a power unit that includes a ring-shaped filter for covering the radial air intake. The ring-shaped filter includes a first fixed part and a second mobile part which is movable with respect to the first fixed part through actuator elements, from a filtering position in which the whole radial air intake is covered by the ring-shaped filter, to a bypass position in which the second mobile part uncovers at least partly the radial air intake.

14 Claims, 3 Drawing Sheets

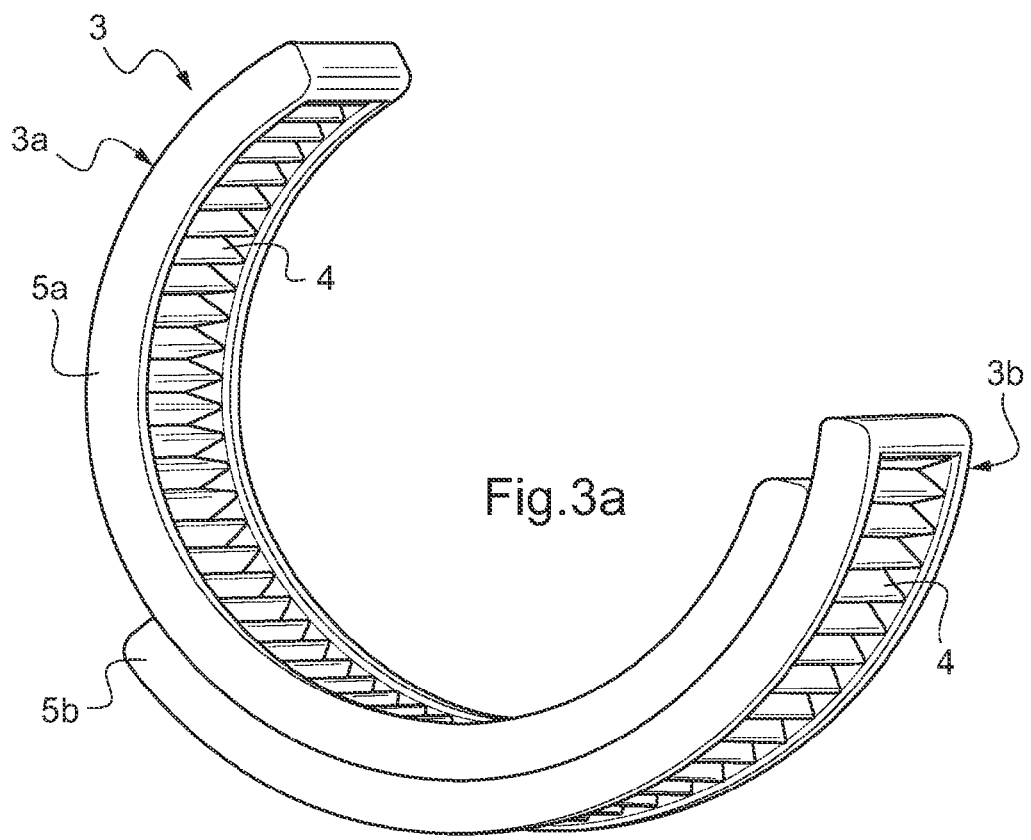
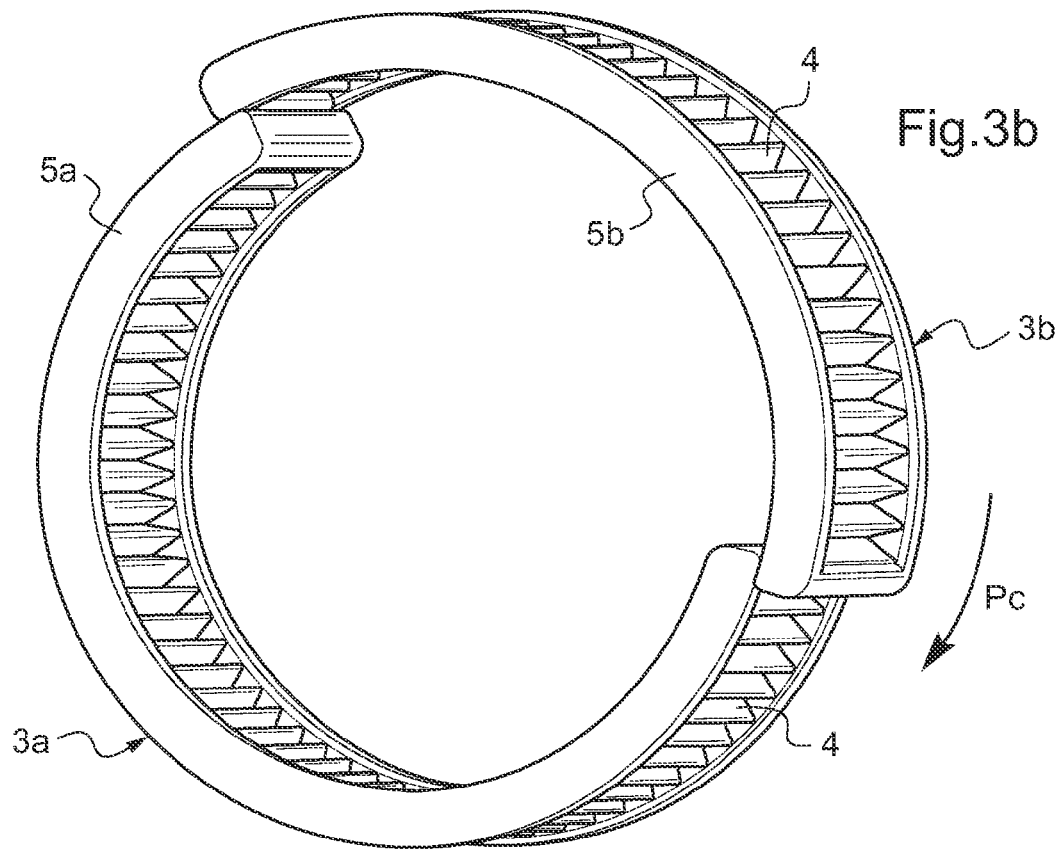

RADIAL AIR INTAKE DEVICE WITH INTEGRATED BYPASS FOR AN AIR INLET

CROSS-REFERENCE TO RELATED APPLICATIONS

This application claims priority to European patent application no. EP 09 400033.8 filed Jul. 2, 2009, the disclosure of which is incorporated in its entirety by reference herein.

BACKGROUND OF THE INVENTION (1) Field of the Invention

The present invention relates to the technical field of inlet barrier filters on engines or on auxiliary power units with radial air intake. Aircrafts or helicopters often have engines, for example turbo-shaft engines with a ring-shaped inlet barrier filter surrounding and covering a radial air intake.

(2) Description of Related Art

These filters, which are exposed to many different operating and background conditions, in particular in aircrafts, can be clogged after some time of operation of the barrier filter. The power provided by the engine will then fall down, what could lead to a stall of the aircraft. In such a situation, the safety of the aircraft is no more guaranteed.

It is the reason why in the past, the inlet barrier filters on engines with radial air intake, were installed on the fuselage or in an air intake channel of the vehicle and not directly on the radial air intake of the engine. It was known to integrate a bypass system in such a channel, which would feed the engine with air in case that a clogging of the barrier filters occurs.

The ring-shaped filters were used only on auxiliary power units with radial air intake, since it was not possible to integrate a bypass system on a radial air intake and since a clogging of the barrier filter on the auxiliary power unit was not critical with respect to the safety of the aircraft.

Integrating a bypass system in an air intake channel is associated with disadvantages when used in aircraft, in particular in helicopters, because both, the channel and the bypass system should be as compact as possible in order to reduce as much as possible their space requirement. This can very easily lead to an increase in conception, manufacturing and fabrication costs.

Another disadvantage arises because retrofitting a filter with a bypass system on a fuselage or in an air intake channel of an existing helicopter or aircraft, is a big change on the air intake and usually causes a lot of qualification and certification work.

It is also known, for example with document FR 2 906 569 to provide an aircraft with a polyvalent air inlet for a turbo-shaft engine, which has a movable closing unit for closing a non filtering air inlet when the aircraft is at proximity of the ground and closing a filtering inlet during flying of the aircraft. The closing unit is a cylindrical and movable tube with an opening which is set either facing the filtering inlet or facing the non filtering inlet.

It is also known, for example with document FR 2 924 471 to provide an aircraft with an air intake for a turbo-shaft engine equipped with a controlled filtering system. The filtering means are compressed within a corresponding frame in order to open the radial air intake at several positions for direct air admission without filtering.

It is the object of the invention to overcome the mentioned disadvantages and to be able to provide a filtering device for engines or power units with radial air intake, which integrates a bypass system and which is located on the radial air intake.

It is an additional object of the invention to provide a filtering device for engines or power units with radial air intake, which needs a low space requirement in the aircraft.

It is an additional object of the invention to provide a filtering device for engines or power units with radial air intake, which has a low number of parts, which is cheap, easy to manufacture and to replace.

BRIEF SUMMARY OF THE INVENTION

These objects are met by a filtering device for an engine or a power unit with a radial air intake, comprising a ring-shaped filter for covering the radial air intake, characterised in that the ring-shaped filter comprises a first fixed part and a second mobile part, comprising each a rigid frame in which a filtering material is inserted and affixed, the second mobile part being movable with respect to the first fixed part through actuator means, from a filtering position in which the whole radial air intake is covered by the ring-shaped filter, to a bypass position in which the second mobile part uncovers at least partly the radial air intake.

According to one exemplary embodiment of the filtering device according to the invention, the first fixed part and second mobile part form each a half of the ring-shaped filter.

According to one exemplary embodiment of the filtering device according to the invention, the second mobile part is sliding along the first fixed part in its displacement from the filtering position to the bypass position.

According to one exemplary embodiment of the filtering device according to the invention, the second mobile part has a greater diameter than the diameter of the first fixed part and is sliding on an outer side or face of the first fixed part.

According to another exemplary embodiment of the filtering device according to the invention, the second mobile part has a smaller diameter than the diameter of the first fixed part and is sliding on the inner side or face of the first fixed part.

According to one exemplary embodiment of the filtering device according to the invention, the second mobile part is sliding along a portion of a circular path.

According to another exemplary embodiment of the filtering device according to the invention, the second mobile part is sliding along a portion of a straight path in the longitudinal direction of the ring-shaped filter in its displacement from the filtering position to the bypass position.

According to one exemplary embodiment of the filtering device according to the invention, each part of the ring-shaped filter comprises a rigid frame containing filtering material such as cotton. The filtering material comprises for example several layers of cotton between two mashed grids. The grids are for example made of aluminium and the frame is for example made of carbon fiber. To improve the efficiency of the filter, the cotton can be impregnated with oil.

According to one exemplary embodiment of the filtering device according to the invention, the actuator means comprise electrical and/or mechanical means, such as an electrical or hydraulically motor or linear actuator.

In a further embodiment of the invention it has been shown to be advantageous if it comprises sensor means for detecting during operation a total or partly clogged state of the ring-shaped filter and driving means for activating the actuator means as soon as a total or partly clogged state occurs or as soon as particular flight conditions arise. In particular flight conditions, when no harmful dust or ice may enter the radial air intake, the second mobile part can be set in its bypass position. This would enhance the performance of the engine of the aircraft. In other flight conditions, such as in a dust or sand environment, for example by landing, the second mobile part can be set in its filtering position. The displacement of the second mobile part is preferably driven automatically.

According to one exemplary embodiment of the filtering device according to the invention, it comprises retaining and sliding means which ensure the retaining and the sliding of the second mobile part with respect to the first fixed part.

These objects are also met by an engine, such as a turbo-shaft engine, comprising a filtering device according to the invention.

These objects are also met by an auxiliary power unit, for example in an aircraft, comprising a filtering device according to the invention.

The objects of the invention are also met by a helicopter in which a filtering device according to the invention is installed.

According to the invention the safety of the aircraft is improved because although if a clogging of the inlet barrier filter of the engine occurs, the aircraft has still the possibility, without any loss of power, to reach its goal, where a maintenance operation can be engaged.

There is a further advantage in that a filtering device according to the invention provides a ring-shaped inlet barrier filter with a bypass system.

There is a further advantage according to the invention in that the filtering device can easily be adapted to different existing turbo-shaft engines with radial air intake.

There is a further advantage with the filtering device according to the invention, in that the usual air intake of the engine will be used and in that no modification of the existing air intake needs to be done. This avoids additional certification work, like icing test, while integrating an inlet barrier filter into an existing engine.

BRIEF DESCRIPTION OF THE SEVERAL VIEWS OF THE DRAWINGS

Further advantages, characteristics and details of the invention are set out in the following description of a preferred exemplary embodiment as well as with reference to the drawings, which show the following:

FIG. 2a, a perspective and part-view of the filtering device of FIG. 1a, in particular according to the section A-A of FIG. 1a;

FIG. 3a, a perspective and part-view of the filtering device according to the invention, and with a mobile part in a bypass position;

FIG. 3b, a perspective and part-view of the filtering device according to the invention, and with a mobile part in a filtering position;

DETAILED DESCRIPTION OF THE INVENTION

Figure 1A:
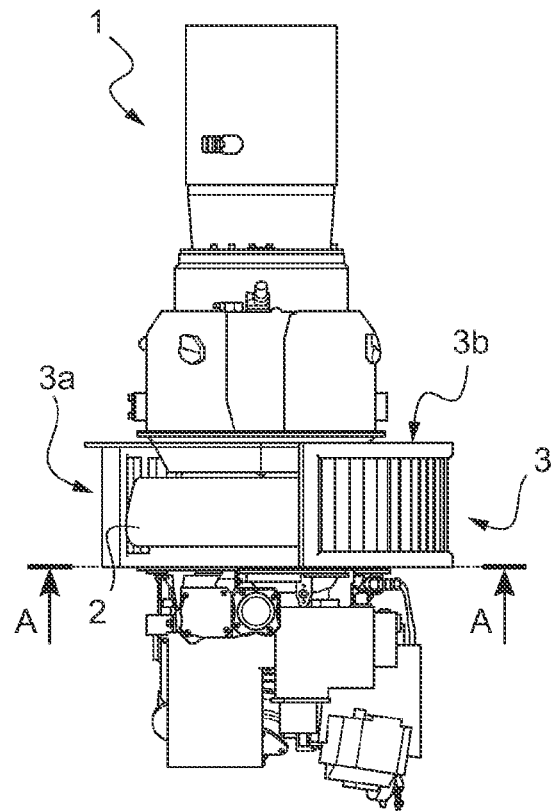
FIG. 1a, a view of an example of a filtering device mounted on an engine, in particular a filtering device with a mobile part in a bypass position, according to the invention.

FIG. 1a is a view of an example of a filtering device according to the invention, which is mounted on an engine 1. The engine 1, of the turbo-shaft type, has a radial air intake 2.

The filtering device according to the invention comprises a ring-shaped filter 3 which covers the radial air intake 2. This ring-shaped filter 3 is an inlet barrier filter on the engine 1.

The ring-shaped filter 3 comprises a first fixed part 3a and a second mobile part 3b which is movable with respect to the first fixed part 3a through actuator means. The second mobile part 3b is movable from a filtering position, illustrated in FIGS. 1b and 2b, in which the whole radial air intake 2 is covered by the ring-shaped filter 3, to a bypass position, illustrated in FIGS. 1a and 2a, in which the second mobile part 3b uncovers at least partly the radial air intake 2. The engine 1 provides the fixing support for the second fixed part 3b.

The bypass position is shown for example in the FIGS. 1a, 2a, 3a and 4 while the filtering position is shown in FIGS. 1b, 2b, 3b and 5.

Figure 2A:
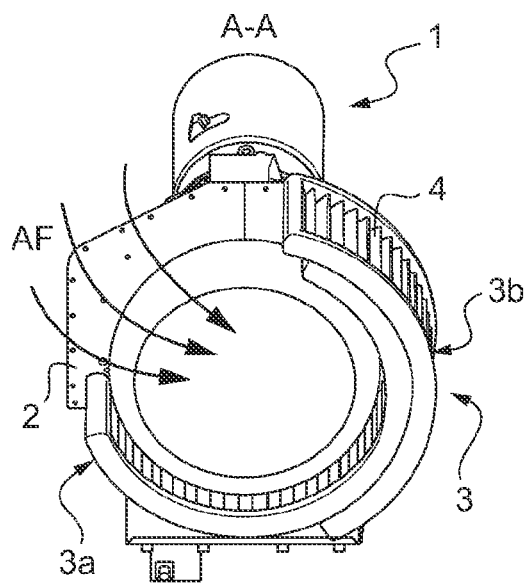

FIG. 2a is a perspective and part-view of the filtering device of FIG. 1a, in particular according to the section A-A. The second mobile part 3b has slit along the first fixed part 3a during its displacement from the filtering position to the bypass position. In the bypass position, an air flow AF penetrates directly in the engine 1, through the radial air intake 2.

Figure 1B:
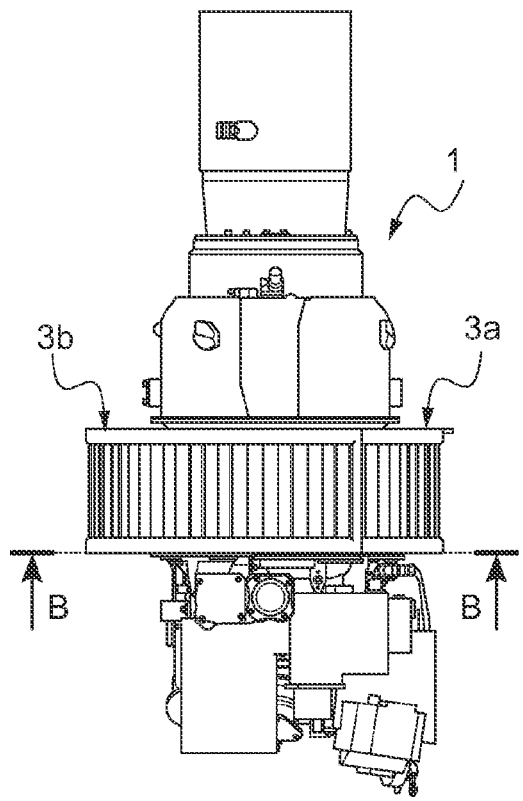
FIG. 1b, a view of an example of a filtering device mounted on an engine, in particular a filtering device with a mobile part in a filtering position, according to the invention.
Figure 2B:
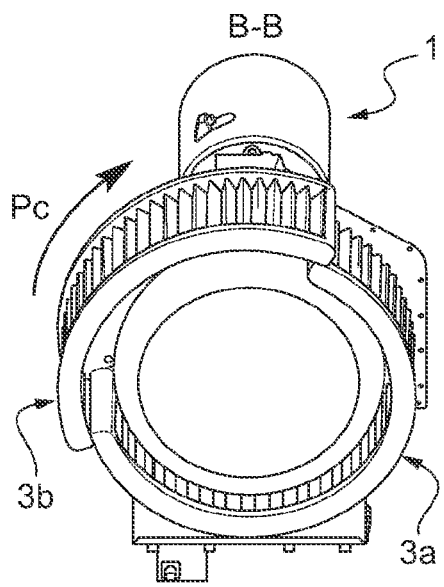
FIG. 2b, a perspective and part-view of the filtering device of FIG. 1b, in particular according to the section B-B of FIG. 1b.

FIG. 2b is a perspective and part-view of the filtering device of FIG. 1b, in particular according to the section B-B. The second mobile part 3b is in its filtering position. In this filtering position, an air flow AF penetrates in the radial air intake 2 through the entire periphery of the ring-shaped filter 3.

In one embodiment of the invention, the first fixed part 3a and second mobile part 3b form each a half of the ring-shaped filter 3.

Each part 3a, 3b of the ring-shaped filter 3 comprises a rigid frame 5a, 5b containing filtering material 4 such as several layers of cotton.

In the embodiment of the invention shown in FIGS. 1b, 2b, and 3b, the second mobile part 3b is sliding along a portion of a circular path Pc, indicated by a corresponding arrow on the drawings.

In this respect, in one embodiment of the invention, the second mobile part 3b has a greater diameter than the diameter of the first fixed part 3a. This allows the second mobile part 3b to slide on an outer side or face of the first fixed part 3a.

In an alternative embodiment of the invention (not shown), the second mobile part 3b has a smaller diameter than the diameter of the first fixed part 3a. This allows the second mobile part 3 to slide on an inner side or face of the first fixed part 3a.

Figure 4:
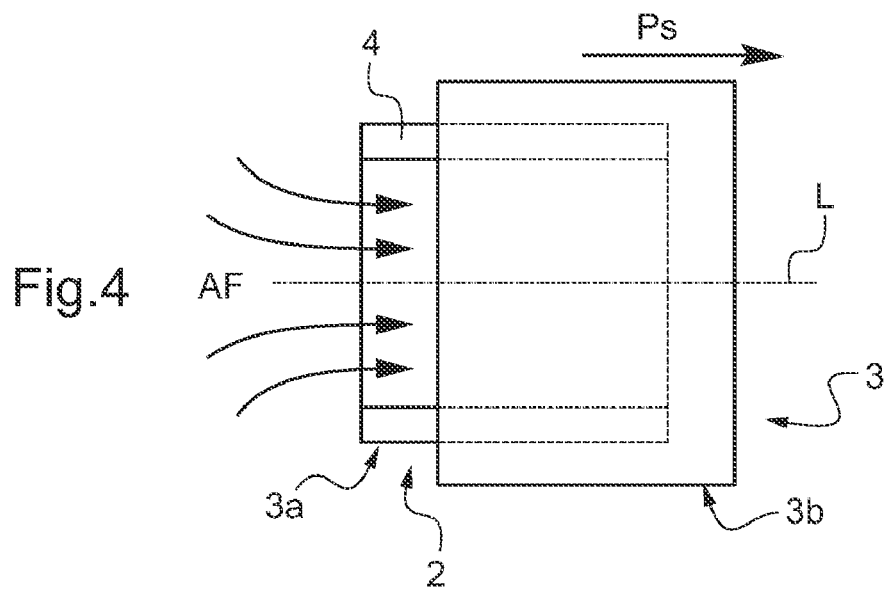
FIG. 4, an illustration of an additional example of a filtering device according to the invention, in particular a filtering device with a mobile part in a bypass position after a translation displacement of the mobile part.
Figure 5:
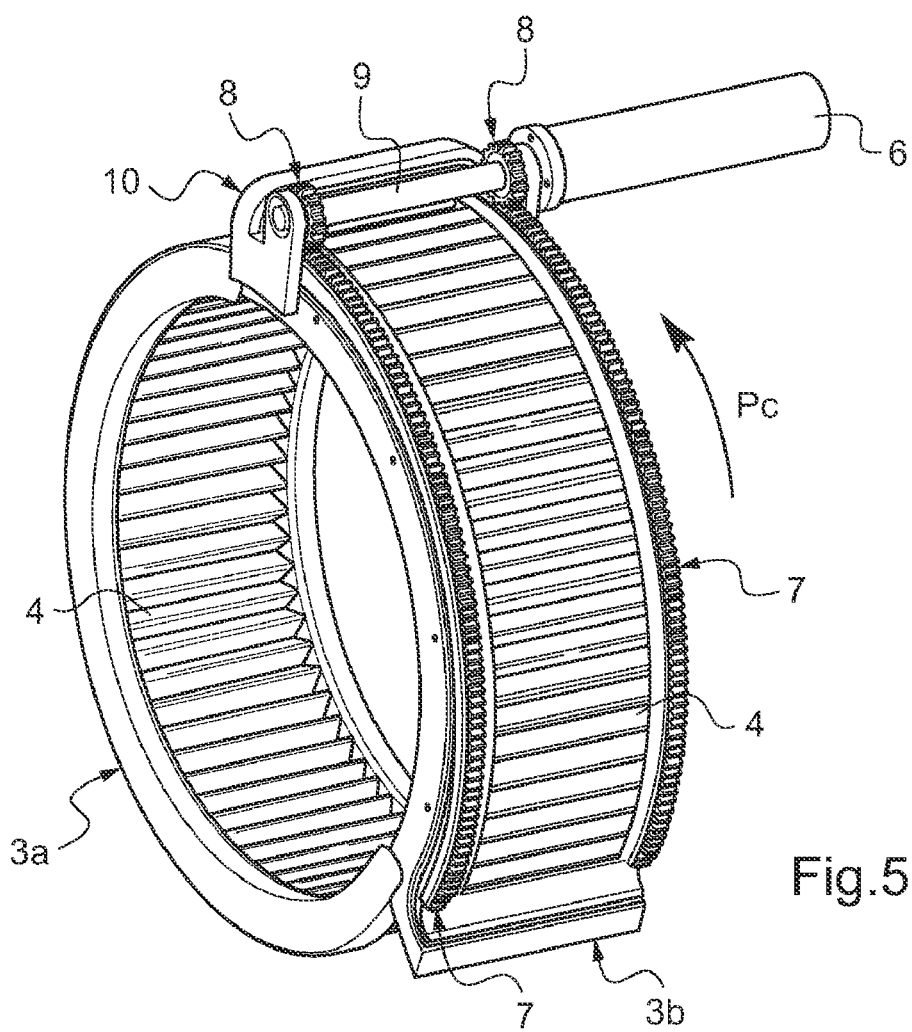
FIG. 5, a perspective and part-view of the filtering device according to the invention, showing actuator means, the fixed part and the mobile part of a ring-shaped filter.

In another embodiment of the invention, as shown in FIG. 4, the second mobile part 3b is sliding along a portion of a straight path Ps in the longitudinal direction L of the ring-shaped filter 3. The longitudinal direction L corresponds to the central axis of the ring-shaped filter 3. The straight path Ps is identified by a corresponding arrow on the drawing of FIG. 4.

After a short translation along the longitudinal direction L, the second mobile part 3b, in its bypass position, uncovers the length of the radial air intake 2 which was previously covered by this second mobile part 3b. Consequently, an air flow AF penetrates directly in the engine 1, through the radial air intake 2.

The filtering device according to the invention comprises also actuator means for moving, when they are activated, the second mobile part 3b in the bypass position. The actuator means comprise electrical and/or mechanical means. The actuator means comprise for example an electrical or hydraulically motor 6 which can open the bypass through a least one curved rack 7 on the second mobile part 3b. The curved rack 7 cooperates with a least one pinion 8 which is mounted on a driveshaft 9 of the motor 6. The second mobile part 3b can then move along the circular path Pc. The driveshaft 9 with its two pinions 8 is mounted on a fixed guiding cage 10, through which moves the second mobile part 3b. The illustrated example shows the driveshaft 9 with a pinion 8 on each end. Each pinion 8 cooperates with a corresponding curved rack 7. The second mobile part 3b with its curved racks 7 is retained between the first fixed part 3a and the pinions 8.

Alternatively, the actuator means could comprise an electrical or hydraulically linear actuator which can push or pull the second mobile part along the straight path Ps.

According to one exemplary embodiment of the filtering device according to the invention, it comprises retaining and sliding means which ensure the retaining and the sliding of the second mobile part with respect to the first fixed part. The retaining and sliding means comprise for example two rails (not shown) affixed on the first fixed part along the circular path Pc or along the straight path Ps. The retaining function can be achieved in any known manner. The retaining function can be achieved by the motor or the linear actuator. Besides the moving, they are also able to hold their position.

In one embodiment of the invention, the filtering device comprises sensor means for detecting a total or partly clogged state of the ring-shaped filter 3 and driving means for activating the actuator means as soon as a clogged state or a partly clogged state occurs. The driving means are integrated for example in a control unit (not shown).

By means of the sensor and driving means, it is achieved that no dysfunction of the engine 1 or no decrease in the power furnished by the engine 1 occurs consequently of a total or partly clogging of the ring-shaped filter 3 during operation.

Of course, within the scope of the invention it is possible to provide still further embodiment options. The invention also covers variants of technical characteristics and that are not described in detail but that suggest themselves to the average person skilled in the art.

The invention claimed is:

1. A radial air intake for an aircraft engine or a power unit with a ring-shaped filter for covering the radial air intake, wherein the ring-shaped filter comprises
    a first fixed part and a second mobile part, each comprising a rigid frame in which a filtering material is inserted and affixed,
    the rigid frame of the second mobile part being movable with respect to the first fixed part through actuator means from a filtering position in which the whole radial air intake is covered by the ring-shaped filter, to a bypass position in which the second mobile part uncovers at least partly the radial air intake,
    the second mobile part sliding along the first fixed part in its displacement from the filtering position to the bypass position and the second mobile part presenting a greater diameter than a diameter of the first fixed part while sliding on an outer side or face of the first fixed part,
    the second mobile part having a smaller diameter than the diameter of the first fixed part while sliding on an inner side or face of the first fixed part.

2. The radial air intake according to claim 1, wherein the first fixed part and second mobile part each form a half of the ring-shaped filter.

3. The radial air intake according to claim 1, wherein the second mobile part is sliding along a portion of a circular path (Pc).

4. The radial air intake according to the claim 1, wherein the second mobile part is sliding along a portion of a straight path (Ps) in the longitudinal direction (L) of the ring-shaped filter in its displacement from the filtering position to the bypass position.

5. The radial air intake according to claim 1, wherein each part of the ring-shaped filter contains a filtering material such as several layers of cotton.

6. The radial air intake according to claim 1, wherein the actuator means comprise electrical and/or mechanical means such as an electrical or hydraulically motor or linear actuator.

7. The radial air intake according to claim 1, further comprising retaining and sliding means which ensure the retaining and the sliding of the second mobile part with respect to the first fixed part.

8. The radial air intake according to claim 1, further comprising sensor means for detecting during operation a total or partly clogged state of the ring-shaped filter and driving means for activating the actuator means as soon as a total or partly clogged state occurs or as soon as particular flight conditions arise.

9. An engine, such as a turbo-shaft engine, comprising a radial air intake according to claim 1.

10. An auxiliary power unit, in an aircraft, comprising a radial air intake according to claim 1.

11. The air radial intake according to claim 2, wherein the second mobile part slides at least partially along the first fixed part in its displacement from the filtering position to the bypass position.

12. The air radial intake according to claim 1, wherein the second mobile part slides at least partially along a portion of a circular path (Pc) when the second mobile part presents the smaller diameter.

13. The air radial intake according to claim 1, wherein the second mobile part slides along a portion of a circular path (Pc) when the second mobile part presents the greater diameter.

14. The air radial intake according to claim 2, wherein the second mobile part slides along a portion of a straight path (Ps) in the longitudinal direction (L) of the ring-shaped filter during its displacement from the filtering position to the bypass position.

* * * * *